(12) United States Patent
Huynh et al.

(10) Patent No.: US 7,342,545 B2
(45) Date of Patent: Mar. 11, 2008

(54) ANTENNA SYSTEM CONFIGURATION FOR MOBILE PHONES

(75) Inventors: Minh Chau Huynh, Morrisville, NC (US); Gerard James Hayes, Wake Forest, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 0 days.

(21) Appl. No.: 11/307,927

(22) Filed: Feb. 28, 2006

(65) Prior Publication Data

US 2007/0200772 A1    Aug. 30, 2007

(51) Int. Cl.
*H01Q 1/24* (2006.01)
(52) U.S. Cl. .......................... 343/702; 343/860
(58) Field of Classification Search ............. 343/702, 343/860; 455/90.3
See application file for complete search history.

(56) References Cited

U.S. PATENT DOCUMENTS

| | | | |
|---|---|---|---|
| 5,812,093 A * | 9/1998 | Thompson et al. | 343/702 |
| 5,905,966 A * | 5/1999 | Yoshihara et al. | 455/575.7 |
| 6,034,639 A | 3/2000 | Rawlins et al. | |
| 6,147,651 A | 11/2000 | Yamazaki | |
| 6,272,356 B1 * | 8/2001 | Dolman et al. | 455/575.3 |
| 6,563,467 B1 * | 5/2003 | Buris et al. | 343/702 |
| 6,975,273 B1 * | 12/2005 | Choi | 343/702 |
| 2002/0055338 A1 | 5/2002 | Greverie et al. | |
| 2003/0083023 A1 | 5/2003 | Chang et al. | |
| 2006/0009156 A1 | 1/2006 | Hayes et al. | |
| 2007/0013591 A1 * | 1/2007 | Ota et al. | 343/702 |

FOREIGN PATENT DOCUMENTS

| | | |
|---|---|---|
| DE | 19639642 | 4/1997 |
| EP | 0613206 | 8/1994 |
| EP | 1069641 | 1/2001 |
| EP | 1505727 | 2/2005 |
| JP | 2001257514 | 9/2001 |

OTHER PUBLICATIONS

Sony Ericsson Mobile Communications AB, International Application No. PCT/US06/060029, International Search Report, May 7, 2007.
Sony Ericsson Mobile Communications AB, International Application No. PCT/US06/060029, Written Opinion, Report, May 7, 2007.
Sony Ericsson Mobile Communications AB, International Application No. PCT/US06/060029, "Partial International Search Report", Mar. 15, 2007.

* cited by examiner

*Primary Examiner*—Tan Ho
(74) *Attorney, Agent, or Firm*—Frederick D. Bailey; Moore & Van Allen, PLLC

(57) ABSTRACT

An antenna configuration for a flip type mobile phone is disclosed. The antenna configuration is designed to reduce, to a hearing aid compatibility (HAC) M3 rating or better, any scattered EM field effects that can cause interference to an active hearing aid. The antenna configuration comprises a halfwave type antenna extendable from the lower portion of the mobile phone. The antenna does not share the same vertical axis as the lower portion of the mobile phone when extended. Rather, it forms a tilt angle (α) that extends the antenna away from the upper portion of the mobile phone creating a greater separation distance between the speaker and the antenna. An antenna feed contact couples the antenna to components within the mobile phone. An antenna matching network can tune and attenuate the antenna configuration to enhance operation in the GSM frequency bands.

7 Claims, 4 Drawing Sheets

ANTENNA SYSTEM CONFIGURATION FOR MOBILE PHONES

BACKGROUND

In general, a hearing aid operates by using a microphone to pick up sound waves in the air and convert the sound waves to electrical signals. The signals are then amplified as needed and converted back to audible sounds for the user to hear. The hearing aid microphone, however, does not always work well in conjunction with audio devices like mobile phone handsets. The acoustic connection made between the audio device and the hearing aid can be poor and can create distortions in the sound. In addition, the surrounding noise in the area of the user is often picked up by the hearing aid and interferes with the desired audio.

Mobile phones are often incompatible with many hearing aids due to the potential for radio frequency (RF) interference in the form of scattered EM fields generated by the mobile phone while in use. When a mobile phone is in communication with its network, an electromagnetic field is present around the mobile phone antenna. When the mobile phone is in use this field pulses. It is this pulsing energy that may be picked up by the hearing aid's microphone or telecoil circuitry and heard as a buzzing sound (i.e., interference) through the hearing aid.

To address this situation the United States Federal Communications Commission (FCC) has promulgated hearing aid compatibility (HAC) rules to minimize the interference between a mobile handset and a hearing aid. As of Sep. 16, 2005 mobile phone handset makers are to include at least 4 or 25% of their mobile phone handset offerings that meet or exceed the ANSI (American National's Standard Institute) hearing aid compatibility (HAC) standard.

The FCC defines HAC for mobile phones in terms of two parameters; radio-frequency (RF) emissions (M-scale) and telecoil coupling (T-scale). Mobile phones that comply with the FCC's hearing aid compatibility rule must receive a minimum rating of M3 for RF emissions and T3 for telecoil coupling. The FCC requires that nationwide carriers offer a range of phones that comply with HAC regulations beginning in September 2005 for microphone (M) mode and in September 2006 for (T) telecoil mode.

As part of hearing aid compatibility (HAC) assessment, near-field components of electromagnetic fields are measured. These components comprise electric and magnetic fields. Tables 1 and 2 illustrate the electric and magnetic field M ratings for the FCC HAC standards.

TABLE 1

M Ratings for HAC in standard units

| Category | E-Field Emission Limits (V/m) | H-Field Emission Limits A/m |
|---|---|---|
| M1 | 149.6-266.1 | 0.45-0.8 |
| M2 | 84.1-149.6 | 0.25-0.45 |
| M3 | 47.3-84.1 | 0.15-0.25 |
| M4 | <47.3 | <0.15 |

TABLE 2

M Ratings for HAC converted to dB values

| Category | E-Field Emission Limits (dBV/m) | H-Field Emission Limits (dBA/m) |
|---|---|---|
| M1 | 43.5-48.5 | −6.9--1.9 |
| M2 | 38.5-43.5 | −11.9--6.9 |
| M3 | 33.5-38.5 | −16.9--11.9 |
| M4 | <33.5 | <−16.9 |

Handsets that receive a hearing aid compatibility rating of M3 or M4 have met or surpassed the ANSI hearing aid compatibility standard as adopted by the Federal Communications Commission. An M3-rating indicates the mobile phone has satisfied the ANSI standard. An M4-rating indicates the mobile phone has exceeded the ANSI standard. The higher the M-rating the mobile phone has the lower the radio frequency (RF) emissions level and higher signal quality the mobile phone will have to the hearing aid device, assuming that the phone is still performing efficiently.

"T" rating refers to a mobile phone's coupling ability and is intended for use with hearing aids in the telecoil mode. The higher the "T" number the more likely you will be able to use your phone with your hearing aid in telecoil mode. The FCC regulations require that cell phones be manufactured for use with hearing aids on telecoil setting by September 2006. For purposes of the present invention, however, only the M rating aspect of HAC is addressed.

For a phone to be HAC compliant, it must be compliant in all US frequency bands of operation for mobile phones. These include the 850-MHz and 1900-MHz bands. Moreover, the mobile phones must, in these operating bands, exhibit, at a minimum, an M3 rating meaning RF emissions from a digital wireless mobile phone are not to exceed −11.9 dB A/m for H-field and 38.6 dB V/m for E-field.

To the inventor's best knowledge, there has not been any mobile phone that meets the M3 rating concurrently in the 850-MHz and 1900-MHz frequency bands of operation.

SUMMARY

According to one embodiment of the present invention, there is an antenna configuration in an extended position for a flip type mobile phone that includes a speaker component near the top end of the upper flip portion of the mobile phone. The antenna configuration is designed to reduce, to a hearing aid compatibility (HAC) M3 rating or better, any scattered EM field effects that can cause interference to an active hearing aid when the flip type mobile phone is operated in relatively close proximity to the active hearing aid.

The antenna configuration comprises a halfwave type antenna capable of extending out from the lower portion of the flip type mobile phone. The antenna does not share the same vertical axis as the lower portion of the flip type mobile phone when in the extended position. Rather, it forms a tilt angle (α) that extends the antenna away from the upper portion of the flip type mobile phone. This creates a greater separation distance between the speaker and the antenna than had the antenna extended along the same vertical axis as the lower portion of the flip type mobile phone. An antenna feed contact is included for coupling the antenna to RF components within the flip type mobile phone.

The antenna configuration can also include an antenna matching network coupled between the antenna feed contact and the antenna. The antenna matching network is for tuning the antenna configuration to operate in the 850 MHZ, 900 MHz, 1800 MHZ, and 1900 MHz GSM frequency bands. The antenna matching network can also attenuate the intensity of the EM fields from the antenna configuration based on the values of its discrete components to further maximize antenna performance operate in the 850 MHZ, 900 MHz, 1800 MHZ, and 1900 MHz GSM frequency bands.

According to another embodiment of the present invention, there is an antenna configuration in a retracted position for a flip type mobile phone that includes a speaker component near the top end of the upper flip portion of the mobile phone. The antenna configuration is designed to reduce, to a hearing aid compatibility (HAC) M3 rating or better, any scattered EM field effects that can cause interference to an active hearing aid when the flip type mobile phone is operated in relatively close proximity to the active hearing aid. The antenna configuration comprises a halfwave type antenna retractable into the lower flip portion of the mobile phone. An antenna feed contact is not in direct contact with the antenna in the retracted position. The antenna is capacitively fed via a coupling effect that is achieved between the antenna and the antenna feed contact. An antenna ground contact positioned a distance, x, up from the bottom tip of the antenna and contacting the antenna when in the retracted position. The distance x is determined based on the tuning requirements of the antenna configuration to maximize efficiency in the 850 MHZ GSM frequency band.

An antenna matching network coupled between the antenna feed contact and the antenna can also be included. The antenna matching network is for tuning the antenna configuration to operate in the 850 MHZ, 900 MHz, 1800 MHZ, and 1900 MHz GSM frequency bands. The antenna matching network also attenuates the antenna configuration based on the values of its discrete components to further maximize antenna performance operate in the 850 MHZ, 900 MHz, 1800 MHZ, and 1900 MHz GSM frequency bands.

DETAILED DESCRIPTION

The present invention discloses an antenna system or configuration for a mobile phone that reduces the scattered EM field effects to hearing aids. Specifically, the present invention is designed to meet the United States Federal Communications Commission (FCC) RF emission minimum rating of M3.

Noise in a hearing aid device is generated by electromagnetic (EM) fields emanating from the mobile phone. These EM fields come directly from the antenna and from the fields generated due to the induced ground current flowing in the PCB of the mobile phone. In the lower 850 MHz frequency band this ground current can be strong, creating strong fields propagating toward the hearing aid device.

Figure 1:
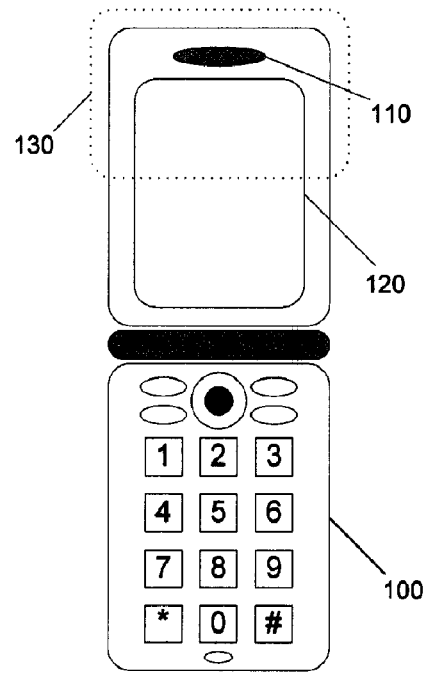
FIG. 1 is an illustration of a typical flip or clamshell type mobile phone showing an outline of a near field scan area where electromagnetic (EM) fields emanating from the mobile phone are most problematic.

FIG. 1 is an illustration of a typical flip type mobile phone 100 showing an outline of a near field scan area 130 in the top-flip around a speaker 110 and partially encompassing the mobile phone's display 120. This is the area of greatest concern since it is the point at which a user with a hearing aid will be in closest proximity to the E-M scattering effect.

Figure 2:
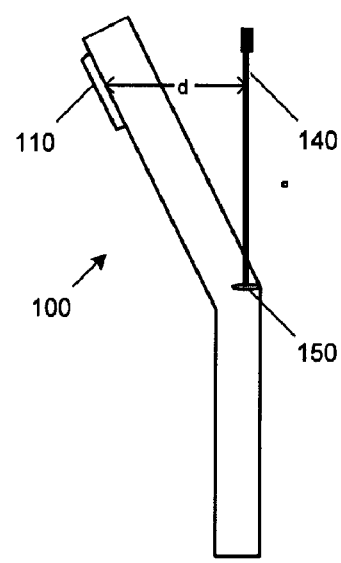
FIG. 2 is a prior art simplified side view of a flip or clamshell type mobile phone illustrating an antenna in the extended position.

FIG. 2 is a prior art simplified side view of a flip or clamshell type mobile phone 100 illustrating an antenna 140 in the extended position. The antenna is coupled with an antenna feed contact 150 to establish an electrical connection with the pertinent components within the mobile phone 100. The speaker 110 (or speaker location) is also illustrated in this side view. The antenna 140 is shown in its extended position which is in the same vertical axis as the bottom flip portion of the mobile phone 100. By keeping the antenna 140 in the same vertical axis as the bottom flip portion of the mobile phone 100, the task of extending and retracting the antenna is kept simple. The problem with this configuration, however, is that the actual distance (d) between the antenna and the near field scan area 130 around the speaker 110 is minimized. This is significant because this distance has an appreciable effect on the intensity of EM fields in the near field scan area 130. The smaller the distance the greater the intensity of EM fields in the near field scan area 130.

Figure 3:
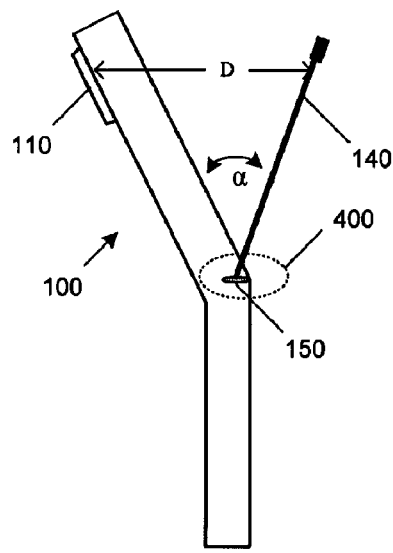
FIG. 3 is a simplified side view of a flip or clamshell type mobile phone illustrating an antenna in the extended position according to an embodiment of the present invention.

FIG. 3 is a simplified side view of a flip or clamshell type mobile phone illustrating an antenna in the extended position according to an embodiment of the present invention. FIG. 3 is similar to FIG. 2 except that antenna 140 extends outward at an angle that is not in the same vertical axis as the bottom flip portion of the mobile phone 100. The antenna 140 extends outward from the bottom flip portion of the mobile phone 100 such that it forms a tilt angle ($\alpha$) with the top flip portion of the mobile phone 100 that is greater than the angle formed had the antenna extended in the same vertical axis as the bottom flip portion of the mobile phone 100. Tilt angle ($\alpha$) in FIG. 3 creates more separation (D) between the antenna 140 and the near field scan area 130 around the speaker 110. The distance (D) in FIG. 3 is greater than the distance (d) in FIG. 2.

The tilt angle is one aspect of the present invention that reduces the intensity of EM fields in the near field scan area 130. Another aspect involves the choice of antenna type. The antenna type is chosen such that ground current flowing on the printed circuit board (PCB) is minimized. A halfwave antenna exhibits such a behavior. These types of antenna include a halfwave monopole and a halfwave top-loaded monopole.

Figure 4:
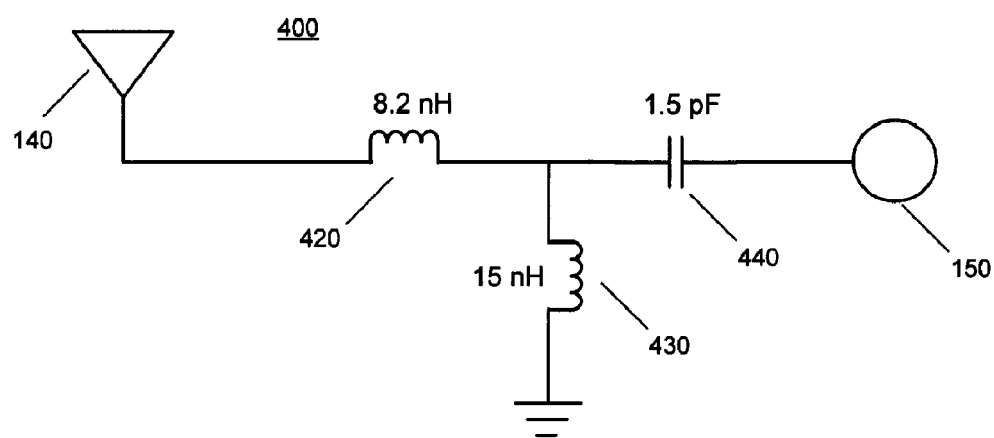
FIG. 4 is an antenna matching network for use with the antenna illustrated in FIG. 2.

In addition, an antenna matching network 400 has been included for two purposes. The first purpose is to tune the antenna 140 to the frequencies of interest. In this case, the antenna 140 is designed to operate in all four GSM bands (850 MHz, 900 MHz, 1800 MHz, and 1900 MHz). The second purpose is to use the antenna matching network 400 to attenuate the output power if the antenna tilt angle (α) previously discussed cannot be made large enough to meet HAC requirements. The antenna matching network 400 can be designed to further attenuate output power when necessary while not attenuating the power at operating bands that do not need any. Based on the discrete component values given in the example of FIG. 4, the antenna matching network 400 attenuates the 850-MHz band while it does not attenuate the 1800 MHz and 1900 MHz. The antenna matching network 400 is a relatively simple circuit comprised of an inductor 420 coupled on one end with the antenna 140. A second inductor 430 is coupled (shunted) to ground on one end and between the first inductor 420 and a capacitor 440 on the other end. The capacitor is also coupled with the antenna feed contact 150.

Figure 5:
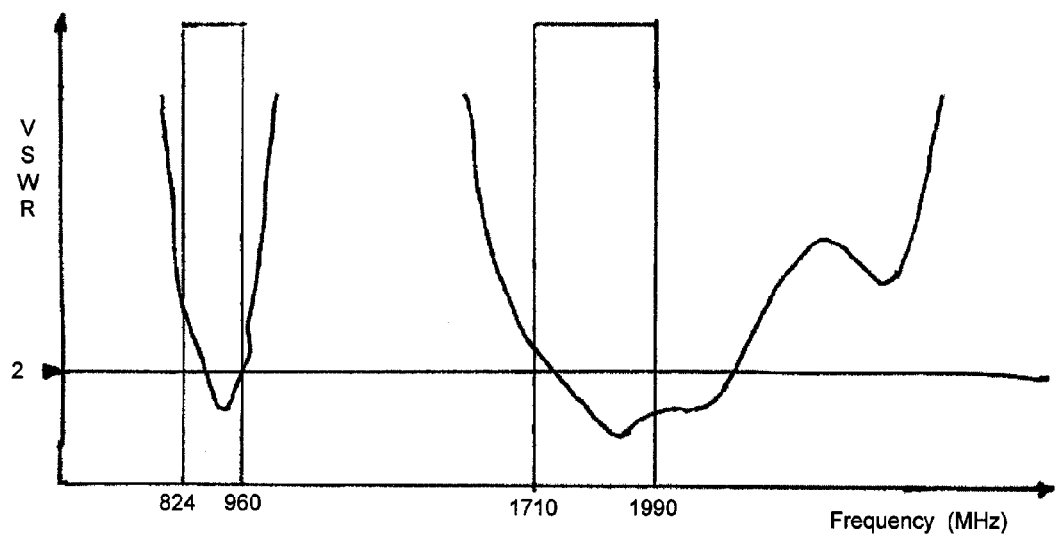
FIG. 5 is a graph illustrating the voltage standing wave ratio (VSWR) for the antenna illustrated in FIG. 2 when the mobile phone is in operation.

FIG. 5 illustrates the voltage standing wave ratio (VSWR) values across the GSM operating bands of interest for the antenna 140 in the extended position as illustrated in FIG. 3. Results were measured with the antenna 140 in the extended position using a clamshell-phone prototype with a tilt angle (α) of 37° between the top flip portion of the mobile phone 100 and the antenna 140. The antenna 140 is a halfwave top-loaded monopole composed of a straight monopole of 85 mm long loaded with a helical part of 9.5 mm height, 6 mm diameter, and 2.5 mm pitch separation. The antenna matching circuit is of a T-network type configuration with discrete component values shown in FIG. 4.

VSWR is a figure of merit to show the antenna impedance match to RF front end of the mobile phone. A VSWR equal to 1 is a perfect match and no mismatch loss occurs. A VSWR of 3 or less is generally a good VSWR value. According to the graph in FIG. 5, the antenna configuration illustrated in FIG. 3 is capable of operating in all four GSM frequency bands, 850 MHz, 900 MHz, 1800 MHz, and 1900 MHz bands in the extended position.

Measurements of electromagnetic fields on the prototype mobile phone having an antenna configuration as described herein to evaluate HAC performance were done according a measurement procedure in compliance with the specifications outlined by the FCC. In order the show that the phone has good radiated performance, total radiated power (TRP) was also measured in free-space environment at all the GSM bands.

Table 3 summarizes the results for the antenna in the extended position. Values for HAC evaluation in the table represent the margin value in dB in compliance with the required M3 rating. Since mobile phone conducted power was calibrated at 32 dBm for 850 MHz and 900 MHz bands and 30.0 dBm for 1800 MHz and 1900 MHz bands, antenna total efficiency can be computed, as shown in Table 3.

TABLE 3

| | Extended Antenna Position | | | |
| --- | --- | --- | --- | --- |
| | 850 MHz | 900 MHz | 1800 MHz | 1900 MHz |
| TRP (dBm) | 28.7 | 27.3 | 24.8 | 25.3 |
| Antenna Total Efficiency (dB) | −3.3 | −4.7 | −5.2 | −4.7 |
| HAC M3 Compliance Margin (dB) | 1.0 | | | 3.2 |

Table 3 illustrates that a clamshell or flip type mobile phone using the extended antenna configuration of the present invention is in compliance with HAC requirements according to the M3 rating in all the US operating bands while still maintaining good radiated performance.

Figure 6:
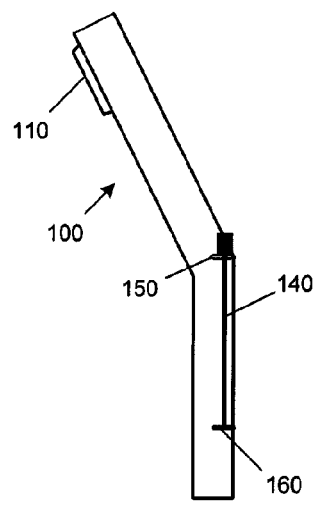
FIG. 6 is a prior art simplified side view of a flip or clamshell type mobile phone illustrating an antenna in the retracted position.

FIG. 6 is a prior art simplified side view of a flip or clamshell type mobile phone 100 illustrating an antenna 140 in the retracted position. The antenna 140 is retracted within the mobile phone 100 such that the top end is in contact with the antenna feed contact 150 and the bottom end is in contact with a ground contact 160.

Figure 7:
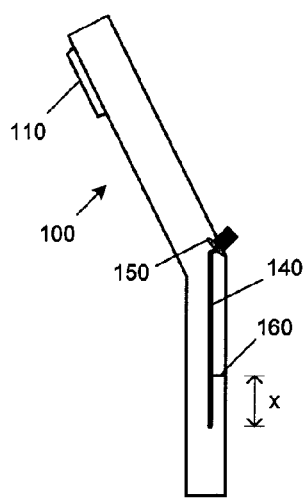
FIG. 7 is a simplified side view of a flip or clamshell type mobile phone illustrating an antenna in the retracted position according to an embodiment of the present invention.

FIG. 7 is a simplified side view of a flip or clamshell type mobile phone 100 illustrating an antenna 140 in the retracted position according to an embodiment of the present invention. FIG. 7 is similar to FIG. 6 except that antenna 140 contacts the ground contact 160 at a different location when retracted. When the antenna 140 is in the retracted position the antenna 140 is not in direct contact with the antenna feed contact 150. In this case, the feeding mechanism is achieved through a coupling effect from the of the antenna 140 located a certain distance x from its bottom tip is contacting directly to ground 160. This permits the antenna to operate effectively in the 850-MHz band. Without the ground contact 160 positioned as it is when the antenna 140 is in the retracted position, the mobile phone 100 would not perform well in the 850-MHz band.

This configuration can be used to meet HAC M3 requirement when used in the retracted position. A top-loaded halfwave monopole antenna is capacitively fed (non-contact feeding) at the bottom of its helical stub. Like the antenna in the extended position, a matching network can be added to the antenna feed to tune the antenna operating frequency and/or attenuate output power if needed. A key characteristic of this embodiment is the grounding of the antenna at distance x from its bottom tip as opposed to grounding the antenna at its bottom tip. By varying x, the frequency tuning in the low-band can be controlled. Furthermore, a matching circuit like that in FIG. 4 can be included between the antenna contact to ground 160 and the ground for finer frequency tuning.

Figure 8:
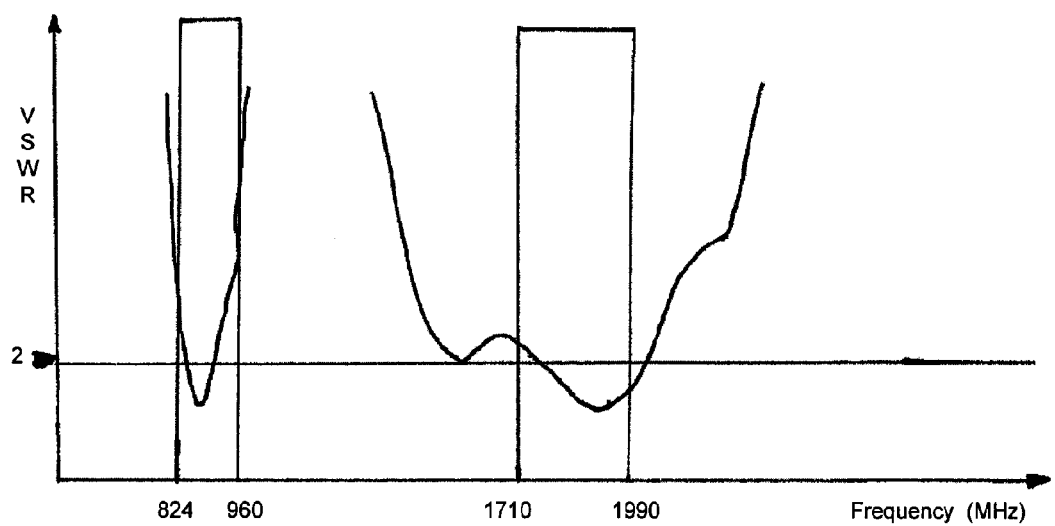
FIG. 8 is a graph illustrating the voltage standing wave ratio (VSWR) for the antenna illustrated in FIG. 7 when the mobile phone is in operation.

FIG. 8 illustrates the VSWR values across the GSM operating bands of interest for the antenna 140 in the retracted position as illustrated in FIG. 7. With the antenna 140 in the retracted position, results were measured for an antenna ground contact 160 that touches the antenna 140 at 19 mm from the antenna bottom tip.

Just as in the extended scenario, the antenna 140 is a halfwave top-loaded monopole composed of a straight monopole of 85 mm long loaded with a helical part of 9.5 mm height, 6 mm diameter, and 2.5 mm pitch separation. The antenna matching circuit is of a T-network type configuration with discrete component values shown in FIG. 4.

According to the graph in FIG. 8, the antenna configuration illustrated in FIG. 7 is capable of operating in all four GSM frequency bands, 850 MHz, 900 MHz, 1800 MHz, and 1900 MHz bands in the retracted position.

Table 4 summarizes the results for the antenna in the retracted position. Values for HAC evaluation in the table represent the margin value in dB in compliance with the required M3 rating. Since mobile phone conducted power was calibrated at 32 dBm for 850 MHz and 900 MHz bands and 30.0 dBm for 1800 MHz and 1900 MHz bands, antenna total efficiency can be computed, as shown in Table 4.

TABLE 4

| | Retracted Antenna Position | | | |
|---|---|---|---|---|
| | 850 MHz | 900 MHz | 1800 MHz | 1900 MHz |
| TRP (dBm) | 27.8 | 23.3 | 24.2 | 23.5 |
| Antenna Total Efficiency (dB) | −4.2 | −8.7 | −5.8 | −6.5 |
| HAC M3 Compliance Margin (dB) | 4.1 | | | 7.6 |

Table 4 illustrates that a clamshell or flip type mobile phone using the retracted antenna configuration of the present invention is in compliance with HAC requirements according to the M3 rating in all the US operating bands while still maintaining good radiated performance.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. An antenna configuration in an extended position for a flip type mobile phone that includes a speaker component near the top end of the upper flip portion of the mobile phone, the antenna configuration designed to reduce, to a hearing aid compatibility (HAC) M3 rating or better, scattered EM field effects that can cause interference to an active hearing aid when the flip type mobile phone is operated in relatively close proximity to the active hearing aid, the antenna configuration comprising:

a halfwave type antenna capable of extending out from the lower portion of the flip type mobile phone such that when extended the antenna does not share the same vertical axis as the lower portion of the flip type mobile phone, but rather forms a tilt angle ($\alpha$) that extends the antenna away from the upper portion of the flip type mobile phone creating a greater separation distance between the speaker and the antenna than had the antenna extended along the same vertical axis as the lower portion of the flip type mobile phone;

an antenna feed contact for coupling the antenna to RF components within the flip type mobile phone; and an antenna matching network coupled between the antenna feed contact and the antenna, the antenna matching network attenuating an output power of the antenna when the tilt angle ($\alpha$) cannot be made large enough to reduce scattered EM field effects to a hearing aid compatibility (HAC) M3 rating or better.

2. The antenna configuration of claim 1 further comprising the antenna matching network being capable of tuning the antenna configuration to operate in the 850 MHZ, 900 MHz, 1800 MHZ, and 1900 MHz GSM frequency bands.

3. The antenna configuration of claim 2 wherein the antenna matching network also attenuates the antenna configuration based on the values of its discrete components to further maximize antenna performance operation in the 850 MHZ, 900 MHz, 1800 MHZ, and 1900 MHz GSM frequency bands.

4. An antenna configuration in a retracted position for a flip type mobile phone that includes a speaker component near the top end of the upper flip portion of the mobile phone, the antenna configuration designed to reduce, to a hearing aid compatibility (HAC) M3 rating or better, scattered EM field effects that can cause interference to an active hearing aid when the flip type mobile phone is operated in relatively close proximity to the active hearing aid, the antenna configuration comprising:

a halfwave type antenna retractable into the lower flip portion of the mobile phone;

an antenna feed contact that is not in direct contact with the antenna in the retracted position wherein the antenna is capacitively fed via a coupling effect that is achieved between the antenna and the antenna feed contact; and an antenna ground contact positioned a distance, x, up from the bottom tip of the antenna and contacting the antenna when in the retracted position.

5. The antenna configuration of claim 4 wherein the distance x is determined based on the tuning requirements of the antenna configuration to maximize efficiency in the 850 MHZ GSM frequency band.

6. The antenna configuration of claim 5 further comprising an antenna matching network coupled between the antenna feed contact and the antenna, the antenna matching network for tuning the antenna configuration to operate in the 850 MHZ, 900 MHz, 1800 MHZ, and 1900 MHz GSM frequency bands.

7. The antenna configuration of claim 6 wherein the antenna matching network also attenuates the antenna configuration based on the values of its discrete components to further maximize antenna performance operate in the 850 MHZ, 900 MHz, 1800 MHZ, and 1900 MHz GSM frequency bands.

* * * * *